United States Patent
Fish et al.

(10) Patent No.: US 10,647,885 B2
(45) Date of Patent: *May 12, 2020

(54) HIGH PERFORMANCE SILICON BASED COATINGS

(71) Applicant: Burning Bush Group, LLC, Kansas City, MO (US)

(72) Inventors: Chris Fish, Kansas City, MO (US); Jerry Kilby, Kansas City, MO (US)

(73) Assignee: Burning Bush Group, LLC, Kansas City, MO (US)

( * ) Notice: Subject to any disclaimer, the term of this patent is extended or adjusted under 35 U.S.C. 154(b) by 0 days.

This patent is subject to a terminal disclaimer.

(21) Appl. No.: 16/380,569

(22) Filed: Apr. 10, 2019

(65) Prior Publication Data

US 2019/0233676 A1    Aug. 1, 2019

Related U.S. Application Data

(63) Continuation of application No. 16/165,557, filed on Oct. 19, 2018, now Pat. No. 10,301,507, which is a continuation of application No. 15/820,853, filed on Nov. 22, 2017, now Pat. No. 10,131,818, which is a continuation of application No. 13/872,588, filed on Apr. 29, 2013, now Pat. No. 9,856,400.

(60) Provisional application No. 61/639,647, filed on Apr. 27, 2012.

(51) Int. Cl.
C09D 183/16   (2006.01)
B05D 3/02     (2006.01)
C08G 77/60    (2006.01)
C08G 77/62    (2006.01)

(52) U.S. Cl.
CPC ......... *C09D 183/16* (2013.01); *B05D 3/0254* (2013.01); *C08G 77/60* (2013.01); *C08G 77/62* (2013.01)

(58) Field of Classification Search
CPC ...... C08G 183/16; C08G 77/60; C08G 77/62; B05D 3/0254; C08L 83/00
See application file for complete search history.

(56) References Cited

U.S. PATENT DOCUMENTS

| | | | |
|---|---|---|---|
| 2,859,137 A | 11/1958 | Ellis |
| 3,419,514 A | 12/1968 | Hadlock |
| 3,445,276 A | 5/1969 | Pikula |
| 4,298,559 A | 11/1981 | Baney |
| 4,349,609 A | 9/1982 | Takeda |
| 4,386,117 A | 5/1983 | Gordon |
| 4,510,283 A | 4/1985 | Takeda |
| 4,529,629 A | 7/1985 | Liu |
| 4,562,091 A | 12/1985 | Sachdev |
| 4,670,057 A | 6/1987 | Oezelli |
| 4,685,930 A | 8/1987 | Kasprzak |
| 4,686,135 A | 8/1987 | Obayashi |
| 4,844,986 A | 7/1989 | Karakelle |
| 4,886,860 A | 12/1989 | Arai |
| 4,946,920 A | 8/1990 | Vaahs |
| 5,086,127 A | 2/1992 | Itoh |
| 5,162,407 A | 11/1992 | Turner |
| 5,364,920 A | 11/1994 | Bujalski |
| 5,489,479 A | 2/1996 | Lucas |
| 5,599,892 A | 2/1997 | Hayashida |
| 5,605,958 A | 2/1997 | Yoneda |
| 5,668,212 A | 9/1997 | Naito |
| 5,907,019 A | 5/1999 | Itoh |
| 5,919,572 A | 7/1999 | Blum |
| 6,013,752 A | 1/2000 | Mowrer |
| 6,255,373 B1 | 7/2001 | Akamatsu |
| 6,329,487 B1 | 12/2001 | Abel |
| 6,562,465 B1 | 5/2003 | Nakashima |
| 6,646,039 B2 | 11/2003 | Li |
| 6,706,798 B2 | 3/2004 | Kobayashi |

(Continued)

FOREIGN PATENT DOCUMENTS

| CN | 101153078 | 4/2008 |
|---|---|---|
| CN | 101768420 | 7/2010 |

(Continued)

OTHER PUBLICATIONS

'Materials Properties Chart,' 2013, https://www.ceramicindustrycom/ext/resources/pdfs/201 3-CCD-Material-Charts.pdf', Accessed Nov. 25, 2016.
'Standard Test Method for Film Hardness by Pencil Test,' 2011, ASTM D3363, 2 pages.
Birot, M. et al., "Comprehensive Chemistry of Polycarbosilanes, Polysilazanes, and Polycarbosilazanes as Precursors of Ceramics," Chemistry Reviews, 95:1443-1477 (1995).
Dow Corning(R) US-CF-2403 Resin. Material Safety Data Sheet. Dow Corning Corporation, May 2013, p. 2. Retrieved from the Internet: <URL: http://www.specialchem4coatings.com/tds/dow-corning-us-cf-2403-resin/dow-corning/42805/ind ex.aspx>.

(Continued)

*Primary Examiner* — Robert S Walters, Jr.
(74) *Attorney, Agent, or Firm* — Global Patent Group, LLC; Dennis A. Bennett; Clifford A. Schlecht

(57) ABSTRACT

Provided herein is a method of coating a surface. A silicon-based coating composition is coated onto a surface. The composition comprises 5% to 80% polysilazane, 20% to 60% polysiloxane, and polysilane of a formula $(R_1R_2Si)_n$, wherein n is greater than 1, and wherein $R_1$ and $R_2$ are the same or different and are chosen from alkyl, alkenyl, cycloalkyl, alkylamino, aryl, aralkyl, or alkylsilyl, which polysilane has a weight average molecular weight of more than 50,000, and optionally organic solvent. The coating is cured ambiently to provide a non-ceramic clear coating having a thickness ranging between 0.1 mil and 1.5 mil, a hardness ranging between 2H and 9H in accordance with ASTM 3363 for film hardness by pencil test, and a kinetic coefficient of friction between 0.03 and 0.04. Also provided are silicon-based coating compositions and cured coatings from those compositions using the provided method.

28 Claims, No Drawings

(56) References Cited

U.S. PATENT DOCUMENTS

| | | | |
|---|---|---|---|
| 6,734,250 B2 | 5/2004 | Azechi | |
| 6,756,469 B2 | 6/2004 | Lukacs, III | |
| 6,916,529 B2 | 7/2005 | Pabla | |
| 7,462,668 B2 | 12/2008 | Lu | |
| 7,527,872 B2 | 5/2009 | Steele | |
| 7,566,500 B2 | 7/2009 | Kohama | |
| 7,687,150 B2 | 3/2010 | Simendinger, III | |
| 7,709,574 B2 | 5/2010 | Wan | |
| 7,754,003 B2 | 7/2010 | Aoki | |
| 7,815,864 B2 | 10/2010 | Betz | |
| 7,857,905 B2 | 12/2010 | Hayes | |
| 7,887,881 B2 | 2/2011 | Lu | |
| 8,232,234 B2 | 7/2012 | Raj | |
| 8,535,761 B2 | 9/2013 | Laine | |
| 8,563,409 B2 | 10/2013 | Morita | |
| 9,856,400 B2 | 1/2018 | Fish | |
| 10,131,818 B2 | 11/2018 | Fish | |
| 10,301,507 B2 | 5/2019 | Fish | |
| 2002/0015851 A1 | 2/2002 | Higuchi | |
| 2003/0083453 A1 | 5/2003 | Lukacs | |
| 2003/0109633 A1 | 6/2003 | Kobayashi | |
| 2005/0239953 A1 | 10/2005 | Sakurai | |
| 2006/0121266 A1 | 6/2006 | Fandel | |
| 2006/0194707 A1 | 8/2006 | Lu | |
| 2006/0205861 A1 | 9/2006 | Gordon | |
| 2008/0015292 A1 | 1/2008 | Lens | |
| 2008/0178536 A1 | 7/2008 | Johnson | |
| 2008/0305611 A1 | 12/2008 | Hirota | |
| 2009/0253884 A1 | 10/2009 | Ogawa | |
| 2010/0075057 A1 | 3/2010 | Krannich | |
| 2010/0178521 A1 | 7/2010 | Byrne | |
| 2010/0279906 A1 | 11/2010 | Schwarz | |
| 2010/0297903 A1 | 11/2010 | Thiria | |
| 2010/0304152 A1 | 12/2010 | Clarke | |
| 2011/0033708 A1 | 2/2011 | Harimoto | |
| 2011/0086958 A1 | 4/2011 | Lortz | |
| 2011/0171447 A1 | 7/2011 | Krishnamoorthy | |
| 2011/0195259 A1 | 8/2011 | Song | |
| 2012/0107559 A1 | 5/2012 | Ferrar | |
| 2012/0141770 A1 | 6/2012 | Cadet | |
| 2012/0252923 A1 | 10/2012 | Serobian | |
| 2013/0112379 A1 | 5/2013 | Ko | |
| 2013/0122763 A1 | 5/2013 | Fish | |
| 2013/0302526 A1 | 11/2013 | Fish | |
| 2014/0011009 A1 | 1/2014 | Fish | |
| 2014/0234534 A1 | 8/2014 | Fish | |

FOREIGN PATENT DOCUMENTS

| | | |
|---|---|---|
| EP | 0495325 | 7/1992 |
| EP | 1217058 | 6/2002 |
| WO | 1992020634 | 11/1992 |
| WO | 2005108543 | 11/2005 |
| WO | 2008134243 | 11/2008 |
| WO | 2011071698 | 6/2011 |
| WO | 2013170124 | 11/2013 |
| WO | 2014008443 | 1/2014 |
| WO | 2014014542 | 1/2014 |
| WO | 2014130774 | 8/2014 |
| WO | 2015050586 | 4/2015 |
| WO | 2015051301 | 4/2015 |

OTHER PUBLICATIONS

International Application No. PCT/US2013/038644; International Preliminary Report on Patentability, dated Oct. 28, 2014; 10 pages.
International Application No. PCT/US2013/038644; International Search Report and Written Opinion of the International Searching Authority, dated Jan. 28, 2014; 11 pages.
International Application No. PCT/US2013/040501; International Preliminary Report on Patentability, dated Nov. 11, 2014; 10 pages.
International Application No. PCT/US2013/040501; International Search Report and Written Opinion of the International Searching Authority, dated Sep. 30, 2013; 11 pages.
International Application No. PCT/US2013/049398; International Preliminary Report on Patentability, dated Jan. 6, 2015; 14 pages.
International Application No. PCT/US2013/049398; International Search Report and Written Opinion of the International Searching Authority, dated Dec. 20, 2013; 14 pages.
International Application No. PCT/US2014/017596; International Preliminary Report on Patentability, dated Aug. 25, 2015; 7 pages.
International Application No. PCT/US2014/017596; International Search Report and Written Opinion of the International Searching Authority, dated Jun. 5, 2014; 8 pages.
International Application No. PCT/US2014/039684; International Preliminary Report on Patentability, dated Sep. 2, 2015; 27 pages.
International Application No. PCT/US2014/039684; International Search Report and Written Opinion of the International Searching Authority, dated Nov. 19, 2014; 14 pages.
International Application No. PCT/US2014/059139; International Preliminary Report on Patentability, dated Apr. 5, 2016; 14 pages.
International Application No. PCT/US2014/059139; International Search Report and Written Opinion of the International Searching Authority, dated Jan. 2, 2015; 16 pages.
Kadklad RX23, www.kadko.com/products.html, Retrieved Jan. 14, 2014.
Mataki, H. et al., "Polysilane/Polysilazane Composite: Novel Material for Optical Waveguides and Its Application to Mode-Conversion Filters", Jpn. J. Appl. Phys. 43(86):5857-61, (2004).
Oshita, J et al. Synthesis of Poly{[bis(ethynylphenyl)silylene]phenylene}s with Highly Heat-Resistant Properties. Macromolecules. Aug. 1999, vol. 32, No. 19, pp. 5998-6002.
U.S. Appl. No. 13/872,588; Final Office Action, dated Jun. 15, 2016; 12 pages.
U.S. Appl. No. 13/872,588; Final Office Action, dated Jun. 30, 2017; 7 pages.
U.S. Appl. No. 13/872,588; Non-Final Office Action, dated Jul. 16, 2015; 15 pages.
U.S. Appl. No. 13/872,588; Non-Final Office Action, dated Mar. 1, 2017; 12 pages.
U.S. Appl. No. 13/872,588; Notice of Allowance, dated Aug. 31, 2017; 10 pages.
U.S. Appl. No. 13/872,588; Response to Final Office Action, dated Aug. 15, 2016; 12 pages.
U.S. Appl. No. 13/872,588; Response to Non-Final Office Action, dated Aug. 26, 2015; 13 pages.
U.S. Appl. No. 13/872,588; Response to Non-Final Office Action, dated May 30, 2017; 13 pages.
U.S. Appl. No. 15/820,853; Examiner-Initiated Interview Summary, dated Jul. 12, 2018; 1 page.
U.S. Appl. No. 15/820,853; Non-Final Office Action, dated May 16, 2018; 24 pages.
U.S. Appl. No. 15/820,853; Notice of Allowance, dated Jul. 12, 2018; 8 pages.
U.S. Appl. No. 16/165,557; Examiner-Initiated Interview Summary, dated Apr. 8, 2019; 1 page.
U.S. Appl. No. 16/165,557; Non-Final Office Action, dated Feb. 21, 2019; 9 pages.
U.S. Appl. No. 16/165,557; Notice of Allowance, dated Apr. 8, 2019; 9 pages.

HIGH PERFORMANCE SILICON BASED COATINGS

CROSS REFERENCE

This application is a continuation of U.S. patent application Ser. No. 16/165,557, filed Oct. 19, 2018, which is a continuation of U.S. patent application Ser. No. 15/820,853, filed Nov. 22, 2017, now U.S. Pat. No. 10,131,818, which is a continuation of U.S. patent application Ser. No. 13/872,588, filed Apr. 29, 2013, now U.S. Pat. No. 9,856,400, which claims the benefit of the filing date of U.S. provisional application 61/639,647, filed on Apr. 27, 2012, the teachings and content of which are incorporated by reference herein in their entireties for all purposes.

TECHNICAL FIELD

The present invention relates to silicon-based coating compositions formed from silazane, siloxane, and silane, and optionally, organic solvents and additives. The resultant composition can be used for coating a surface to form coatings having good hardness and coefficient of friction characteristics. Such coatings are useful in a wide range of applications.

BACKGROUND

Chemical structure and conformation of the polymer are among the many factors that influence the type of coating required for a particular application. However, the commercial availability of many useful polymers often limits the applications. For example, for a long time polysilazanes have been synthesized and characterized, with acknowledges that such polymer could be useful in a variety of applications. Currently, however, few products have been developed into a marketable commodity. Additionally, there are cost limitations that prohibit use in some cases.

There is a great need for an improved silicon-based coating for use in a wide range of applications. Anything that requires a surface coating with advantageous characteristics such as being moisture curable at ambient temperature conditions without requiring added catalyst or activator for rapid curing, thin but durable, protective and heat-stable, displaying excellent hardness, remaining intact even when the substrate is deformed would find it beneficial to have an improved high-performance coating. In addition, coatings that are customizable in terms of coating color, appearance, feel, glossiness are desirable. Further, coatings with UV resistant, microbial releasable, easy to clean and maintain, corrosion resistant are also in great need for their wide range of uses.

Therefore, given the limitations of the prior art, it is desirable to have a coating composition that has the physical and chemical characteristics of the polymer substrates, and results in coatings possessing a number of desirable properties.

SUMMARY

The invention relates to silicon based coating compositions applicable to a wide range of surfaces, which composition is formed from a mixture of constituents comprising appropriate portions of polymerized silazane resin, polymerized siloxane resin, and polymerized silane resin, and optionally portions of organic solvent and additives, and results in a coating having a hardness of 2-9H (H, Hardness, by ASTM D3363 standard) and a kinetic coefficient of friction between about 0.03 to about 0.04. Such combinations having specific portions of silicon-based polymers provide coatings having advantageous properties including clear, thin, light, slick, hard, heat resistant, high temperature resistant, ice build-up resistant, UV resistant, chemical resistant, and microbial resistant. In addition, the compositions as provided herein allow for a lower concentration of polymerized silazane resin and thus reduce the cost, simplify mixing steps and process, and decrease the odor in the finished coating products.

The current invention relating to a silicon-based coating composition generally comprises from about 0% (w/w) to about 80% (w/w) silazane, from about 0% (w/w) to about 60% (w/w) siloxane, and from about 5% (w/w) to about 80% (w/w) silane, and optionally portions of organic solvent and additives.

One embodiment of the current invention relates to a silicon-based coating composition comprising between about 5% to about 7% (w/w) silazane; between about 60% and about 75% (w/w) silane; and, between about 20% and about 35% (w/w) organic solvent.

A second embodiment of the current invention relates to a silicon based coating composition comprising between about 7% and about 9% (w/w) silazane; between about 7% and about 9% (w/w) siloxane; between about 65% and about 78% (w/w) silane; between about 10% and about 35% (w/w) organic solvent; and, between about 0% and about 2% (w/w) additives.

A third embodiment of the current invention relates to a silicon based coating composition comprising between about 16% and about 18% (w/w) silazane resin comprising; between about 6% and about 8% (w/w) siloxane; between about 65% and about 78% (w/w) silane; between about 0% and about 3% (w/w) organic solvent; and, between about 0% and about 2% (w/w) additives.

A fourth embodiment of the current invention relates to a silicon-based coating composition comprising between about 25% and about 30% (w/w) silazane; between about 8% and about 12% (w/w) silane; between about 55% and about 65% (w/w) organic solvent; and, between about 0% and about 2% (w/w) additives.

A fifth embodiment of the current invention relates to a silicon-based coating composition comprising between about 34% and about 37% (w/w) silazane; between about 25% and about 32% (w/w) silane; between about 25% and about 45% (w/w) organic solvent; and, between about 0% and about 2% (w/w) additives.

A sixth embodiment of the current invention relates to a silicon-based coating composition comprising between about 38% and about 42% (w/w) silazane; between about 20% and about 30% (w/w) silane; between about 20% and about 55% (w/w) organic solvent; and, between about 0% and about 2% (w/w) additives.

A seventh embodiment of the current invention relates to a silicon-based coating composition comprising between about 45% and about 55% (w/w) silazane; between about 20% and about 30% (w/w) silane; between about 10% and about 45% (w/w) organic solvent; and, between about 0% and about 2% (w/w) additives.

An eighth embodiment of the current invention relates to a silicon based coating composition comprising between about 64% and about 68% (w/w) silazane resin; between about 15% and about 19% (w/w) siloxane; between about 15% and about 19% (w/w) silane; between about 0% and about 6% (w/w) organic solvent; and, between about 0% and about 2% (w/w) additives.

A ninth embodiment of the current invention relates to a silicon-based coating composition comprising about 50% (w/w) siloxane; and about 50% silane.

In addition, the present invention further provides a method of coating a surface, the method comprising mixing a mixture of constituents comprising: from about 0% (w/w) to about 80% (w/w) silazane, from about 0% (w/w) to about 60% (w/w) siloxane, and from about 5% (w/w) to about 80% (w/w) silane; coating the mixture onto a surface; and curing the coating ambiently with or without additional heat.

Unless otherwise defined, all technical and scientific terms used herein have the same meaning as is commonly understood by one of skill in the art to which this invention belongs at the time of filing. If specifically defined, then the definition provided herein takes precedent over any dictionary or extrinsic definition. Further, unless otherwise required by context, singular terms shall include pluralities, and plural terms shall include the singular. Herein, the use of "or" means "and/or" unless stated otherwise. All patents and publications referred to herein are incorporated by reference.

DETAILED DESCRIPTION

The present invention relates to silicon-based coating compositions that are formed from certain silicon-based polymers to make high performance coatings with desirable properties.

As such, the top coatings provided by these compositions are clear, thin, hard, slick, having shortened curing process, and with resistance or high endurance to adverse conditions including, but not limited to, drag, scrub, friction, heat, moist, high temperature, low temperature, UV exposure, ice build-up, microbial growth, corrosion, and the like. The compositions comprise polymerized silane and either or both of polymerized silazane and siloxane, and may further comprise one or more non-reactive organic solvents, and/or one or more additives for curing or for finishing, each of which in a proportion as designed herein to achieve certain properties. In addition, the present invention is based in part on the finding that compositions comprising a combination of various silicon-based polymers results in a product providing better protections to exterior surfaces and underlying finish in a wide range of applications.

The silicon-based coating compositions of the present invention include polymerized silazane. "Silazane" and "polysilazane", as appearing in the specification and claims are generic terms intended to include compounds which contain one or more silicon-nitrogen bonds in which the nitrogen atom is bonded to at least two silicon atoms and may or may not contain cyclic units. Therefore, the terms "polysilazane" and "silazane polymer" include monomers, oligomers, cyclic, polycyclic, linear polymers or resinous polymers having at least one Si—N group in the compound, or having repeating units of $H_2Si-NH$, that is, $[H_2Si-NH]_n$, with "n" greater than 1. The chemical structure for polysilazane is shown below.

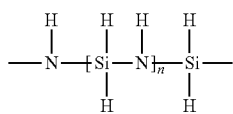

By "oligomer" is meant any molecule or chemical compound which comprises several repeat units, generally from about 2 to 10 repeat units. A simple example of silazane oligomer is disilazane $H_3Si-NH-SiH_3$. "Polymer", as used herein, means a molecule or compound which comprises a large number of repeat units, generally greater than about 10 repeat units. The oligomeric or polymeric silazanes may be amorphous or crystalline in nature. Polysilazane or a mixture of polysilazanes known in the art or commercially available include such products generally known among persons skilled in the art as: silazanes, disilazanes, polysilazanes, ureasilazanes, polyureasilazanes, aminosilanes, organosilazanes, organopolysilazanes, inorganic polysilazanes, and others employing liquid anhydrous ammonia in their production. One group of polysilazane, $[R_1R_2Si-NH]_n$, are isoelectronic with and close relatives to polysiloxane $[R_1R_2Si-O]_n$. A polysilazane with the general formula $(CH_3)_3Si-NH-[(CH_3)_2Si-NH]_n-Si(CH_3)_3$ is designated as polydimethylsilazane.

The making of polysilazane using ammonolysis procedure was disclosed in U.S. Pat. No. 6,329,487. In addition, polysilazane is also commercially available. For example, polysilazane (>99%) in tert-butyl acetate solvent manufactured by KiON Defense Technologies, Inc. (Huntingdon Valley, Pa.) as KDT Ambient Cure Coating Resin (KDT HTA® 1500) is supplied as a 100% solids liquid of low viscosity. KDT HTA® 1500 may comprise less than 5% cyclosilazane, a cyclic form of polysilazane. Similar product is also available from other manufacturers including AZ Electronic Materials (Branchburg, N.J.).

Polysilazane as provided comprises between about 0% and about 80% (w/w) of the total formula weight of silicon based coating compositions. In one embodiment, the silicon based coating composition does not contain polysilazane. In some embodiments, polysilazane (A-Resin, as designated hereinafter) comprises about 80%, 75%, 70%, 65%, 60%, 55%, 50%, 45%, 40%, 35%, 30%, 25%, 20%, 15%, 10%, 5%, 4%, 3%, 2%, 1%, 0% (w/w), or any range thereof, of the silicon based coating composition. For example, the amount of polysilazane, present in the silicon based coating composition may range from between about 5% to about 10%, between about 8% to about 30%, between about 25% to about 40%, between about 35% to about 55%, between about 50% to about 70%, between about 60% to about 80%, (w/w) of the total composition, and preferably ranges from between about 5% to about 7%, between about 7% to about 9%, between about 16% to about 18%, between about 25% to about 30%, between about 34% to about 37%, between about 38% to about 42%, between about 45% to about 55%, between about 64% to about 68%, (w/w) of the total composition. In an exemplary embodiment, the amount of polysilazane present in the composition is 6% (w/w) of the total composition. In another exemplary embodiment, the amount of polysilazane present in the composition is 8% (w/w) of the total composition. In another exemplary embodiment, the amount of polysilazane present in the composition is 19% (w/w) of the total composition. In yet another exemplary embodiment, the amount of polysilazane present in the composition is 28% (w/w) of the total composition. In still another exemplary embodiment, the amount of polysilazane present in the composition is 36% (w/w) of the total composition. In yet another exemplary embodiment, the amount of polysilazane present in the composition is 40% (w/w) of the total composition. In still another exemplary embodiment, the amount of polysilazane present in the composition is 50% (w/w) of the total composition. In still another exemplary embodiment, the amount of polysilazane present in the composition is 66% (w/w) of the total composition.

The silicon based coating compositions of the present invention also include polymerized siloxane. A siloxane is a chemical compound having branched or unbranched backbones consisting of alternating silicon and oxygen atoms —Si—O—Si—O— with side chains R attached to the silicon atoms ($R_1R_2SiO$), where R is a hydrogen atom or a hydrocarbon group. Polymerized siloxanes, including oligomeric and polymeric siloxane units, with organic side chains (R≠H) are commonly known as polysiloxanes, or [$SiOR_1R_2$]$_n$, with "n" greater than 1. The chemical structure for polysiloxanes is shown below.

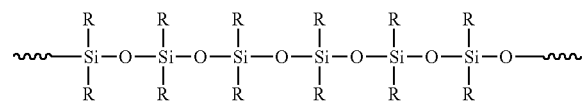

In addition to hydrogen, $R_1$ and $R_2$ of polysiloxane are independently selected from the group consisting of an alkyl, an alkenyl, a cycloalkyl, an alkylamino, aryl, aralkyl, or alkylsilyl. Thus, $R_1$ and $R_2$ can be such groups as methyl, ethyl, propyl, butyl, octyl, decyl, vinyl, allyl, butenyl, octenyl, decenyl, tetradecyl, hexadecyl, eicosyl, tetracosyl, cyclohexyl, methylcyclohexyl, methylamino, ethylamino, phenyl, tolyl, xylyl, naphthyl, benzyl, methylsilyl, ethylsilyl, propylsilyl, butylsilyl, octylsilyl, or decylsilyl. These alkyl, alkenyl, cycloalkyl, aryl, alkyl amino, aralkyl and alkylsilyl groups may each optionally be substituted by one or more substituents which contain heteroatoms, such as halides, like chlorine, bromine and iodine; alkoxy groups, like ethoxy, and also aryl groups, such as acetyl and propionyl. Organic side groups can be used to link two or more of these —Si—O— backbones together. By varying the —Si—O— chain lengths, side groups, and crosslinking, polysiloxanes can vary in consistency from liquid to gel to rubber to hard plastic. Representative examples of polysiloxane are [$SiO(CH_3)_2$]$_n$ (polydimethylsiloxane, PDMS) and [$SiO(C_6H_5)_2$]$_n$ (polydiphenylsiloxane). In a preferred embodiment, the silicon based coating composition comprises polydimethylsiloxane. The chemical structure for polydimethylsiloxane is shown below.

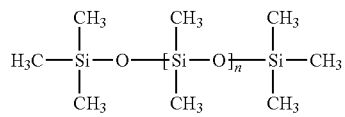

Octamethyltrisiloxane, [$(CH_3)_3SiO$]$_2Si(CH_3)_2$, is a linear siloxane in the polydimethylsiloxane family, with the INCI name as Trisiloxane. The chemical structure for Octamethyltrisiloxane is shown below.

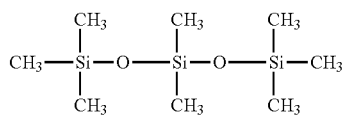

Other methylated siloxanes include, but are not limited to: hexamethyldisiloxane, cyclotetrasiloxane, octamethylcyclotetrasiloxane, decamethyltetrasiloxane, decamethylcyclopentasiloxane. The method of producing high molecular weight polysiloxane product was disclosed in US. App. Pub. 20090253884. In addition, polysiloxane is also commercially available. As one example, polysiloxane, specifically, polydimethylsiloxane, is supplied in isopropyl acetate solvent by Genesee Polymers Corp. (Burton, Mich.), and it is sold as Dimethyl Silicone Fluids G-10 product. Polysiloxane as provided in the form of Dimethyl Silicone Fluids resin (B-Resin, as designated hereinafter) comprises between about 0% and about 60% (w/w) of the total formula weight of silicon based coating compositions. In one embodiment, the silicon based coating composition does not contain polysiloxane in the form of Dimethyl Silicone Fluids. In some embodiments, polysiloxane, in the form of Dimethyl Silicone Fluids or the like, comprises about 60%, 57%, 53%, 50%, 47%, 43%, 40%, 37%, 33%, 30%, 27%, 25%, 23%, 20%, 17%, 15%, 13%, 10%, 7%, 5%, 4%, 3%, 2%, 1% (w/w), or any range thereof, of the silicon based coating composition. For example, the amount of polysiloxane, in the form of Dimethyl Silicone Fluids or the like, present in the silicon based coating composition may range from between about 5% to about 10%, between about 8% to about 22%, between about 20% to about 30%, between about 28% to about 40%, between about 38% to about 50%, between about 48% to about 60%, (w/w) of the total composition, and preferably ranges from between about 6% to about 8%, between about 7% to about 9%, between about 12% to about 20%, between about 22% to about 28%, between about 45% to about 55%, (w/w) of the total composition. In an exemplary embodiment, the amount of polysiloxane, in the form of Dimethyl Silicone Fluids or the like, present in the composition is about 7% (w/w) of the total composition. In an exemplary embodiment, the amount of polysiloxane, in the form of Dimethyl Silicone Fluids or the like, present in the composition is about 8% (w/w) of the total composition. In another exemplary embodiment, the amount of polysiloxane, in the form of Dimethyl Silicone Fluids or the like, present in the composition is 17% (w/w) of the total composition. In another exemplary embodiment, the amount of polysiloxane, in the form of Dimethyl Silicone Fluids or the like, present in the composition is 25% (w/w) of the total composition. In yet another exemplary embodiment, the amount of polysiloxane, in the form of Dimethyl Silicone Fluids or the like, present in the composition is 50% (w/w) of the total composition.

The silicon based coating compositions of the present invention may further include polymerized silane. Silanes are compounds which contain one or more silicon-silicon bonds. Polysilanes [$R_1R_2Si$—$R_1R_2Si$]$_n$ are a large family of inorganic polymers. The number of repeating units, "n", plays a role in determining the molecular weight and viscosity of the composition Like in polysiloxane, $R_1$ and $R_2$ are independently selected from the group consisting of a hydrogen, an alkyl, an alkenyl, a cycloalkyl, an alkylamino, aryl, aralkyl, or alkylsilyl. Thus, $R_1$ and $R_2$ can be such groups as methyl, ethyl, propyl, butyl, octyl, decyl, vinyl, allyl, butenyl, octenyl, decenyl, tetradecyl, hexadecyl, eicosyl, tetracosyl, cyclohexyl, methylcyclohexyl, methylamino, ethylamino, phenyl, tolyl, xylyl, naphthyl, benzyl, methylsilyl, ethylsilyl, propylsilyl, butylsilyl, octylsilyl, or decylsilyl. A polymer with the general formula —[$(CH_3)_2Si$—$(CH_3)_2Si$]—$_n$, is designated as polydimethylsilane. The chemical structure of polydimethylsilane is shown below.

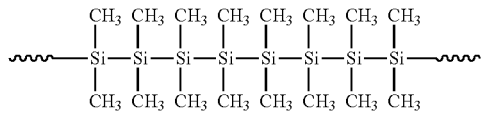

High molecular weight polysilane product with a narrow molecular weight distribution may be obtained by the process of U.S. Pat. No. 5,599,892. Polysilane is also available in a polysilane/polysilazane resin system supplied in a solvent blend from from Kadko, Inc. (Beech Grove, Ind.), and it is sold as a KADKLAD R2X3™ product. Polysilane/polysilazane as provided in the form of KADKLAD R2X3 resin (C-Resin, as designated hereinafter) comprises between about 5% and about 80% (w/w) of the total formula weight of silicon based coating compositions. In one embodiment, the silicon based coating composition does not contain polysilane. In some embodiments, polysilane comprises about 80%, 75%, 70%, 65%, 60%, 55%, 50%, 45%, 40%, 35%, 30%, 27%, 25%, 23%, 20%, 17%, 15%, 13%, 10%, 7%, 5%, 4%, 3%, 2%, 1% (w/w), or any range thereof, of the silicon based coating composition. For example, the amount of polysilane present in the silicon based coating composition may range from between about 60% to about 80%, between about 45% to about 65%, between about 30% to about 55%, between about 15% to about 35%, between about 5% to about 20%, (w/w) of the total composition, and preferably ranges from between about 65% to about 78%, between about 60% to about 75%, between about 25% to about 32%, between about 20% to about 30%, between about 15% to about 19%, between about 8% to about 12%, (w/w) of the total composition. In an exemplary embodiment, the amount of polysilane present in the composition is about 73% (w/w) of the total composition. In another exemplary embodiment, the amount of polysilane present in the composition is 67% (w/w) of the total composition. In another exemplary embodiment, the amount of polysilane present in the composition is 28% (w/w) of the total composition. In yet another exemplary embodiment, the amount of polysilane present in the composition is 25% (w/w) of the total composition. In yet another exemplary embodiment, the amount of polysilane present in the composition is 17% (w/w) of the total composition. In still another exemplary embodiment, the amount of polysilane present in the composition is 10% (w/w) of the total composition.

The silicon based coating compositions of the current invention may additionally include one or more organic solvents. Generally, the organic solvent is defined as a carbon-containing chemical that is capable of dissolving a solid, liquid, or a gas. Although one skilled in the art will appreciate that a wide variety of solvents may be incorporated into the current invention, suitable solvents for the present invention are those that contain no water and no reactive groups such as hydroxyl or amine groups. These solvents include, but not limited to, for example, aromatic hydrocarbons; aliphatic hydrocarbons, such as, hexane, heptane, benzene, toluene, branched-chain alkanes (isoparaffins); halogenated hydrocarbons; esters, such as methyl acetate, n-butyl acetate, tert-butyl acetate, isobutyl acetate, sec-butyl acetate, ethyl acetate, amyl acetate, pentyl acetate, 2-methyl butyl acetate, isoamyl acetate, n-propyl acetate, isopropyl acetate, ethylhexyl acetate; ketones, such as acetone or methyl ethyl ketone; ethers, such as tetrahydrofuran, dibutyl ether; and mono- and polyalkylene glycol dialkyl ethers (glymes) or mixtures of these solvents may be used. In a preferred embodiment, the organic solvent comprises n-butyl acetate. In another preferred embodiment, the organic solvent comprises tert-butyl acetate. In yet another preferred embodiment, the organic solvent comprises isoparaffins.

In addition, the organic solvent generally comprises between about 0% to about 70% (w/w) of the silicon based coating composition. In some embodiments, the organic solvent comprises about 70%, about 65%, about 60%, about 55%, about 50%, about 45%, about 40%, about 35%, about 30%, about 25%, about 20%, about 15%, about 10%, about 5%, or about 0% (w/w) of the total composition. For example, the amount of organic solvent present in the silicon based coating composition preferably ranges from between about 0% to about 35% (w/w) of the composition. In another embodiment, the amount of organic solvent in the silicon based coating composition ranges from between about 10% to about 45% (w/w) of the total composition. In another embodiment, the amount of organic solvent in the silicon based coating composition ranges from between about 10% to about 35% (w/w) of the total composition. In an additional embodiment, the amount of organic solvent in the silicon based coating composition ranges from between about 20% to 55% (w/w) of the total composition. In still another embodiment, the amount of organic solvent in the silicon based coating composition ranges from between about 25% to 45% (w/w).

The silicon based coating compositions of the current invention may further include one or more additives including, but not limited to, curing agents, matting agents, pigments, fillers, flow control agents, dry flow additives, anti-cratering agents, surfactants, texturing agents, light stabilizers, matting agents, photosensitizers, wetting agents, anti-oxidants, plasticizers, opacifiers, stabilizers, degassing agents, corrosion inhibitors, ceramic microspheres, slip agents, dispersing agents, and surface altering additives.

Among various coating composition additives that may be optionally added, substances or mixtures of substances added to a polymer composition to promote or control the curing reaction are curing agents, which include catalyst and hardener. As generally known, curing catalyst increases the rate of a chemical reaction as an initiator. It is added in a small quantity as compared to the amounts of primary reactants, and does not become a component part of the chain. In contrast, curing hardener, often an amine, enables the formation of a complex three-dimensional molecular structure by chemical reaction between the polymers and the amine. It is essential that the correct mix ratio is obtained between resin and hardener to ensure that a complete reaction takes place, such that no unreacted resin or hardener will remain within the matrix to affect the final properties after cure. Conventional polyamine hardeners comprise primary or secondary amine groups. A polysilazane-modified polyamine hardener was described in U.S. Pat. No. 6,756,469, providing heated polyamine in the presence of a polysilazane to prepare a hardener imparting enhanced high temperature properties, higher char yields and better adhesion properties. In some embodiment of the present invention, neither catalyst nor hardener is needed for a curing process that is initiated via solvent condensation. In some embodiment of the present invention, each polymer in the composition is capable of curing independently of the other without the need of forming co-polymers.

The matting agents used in the practice of this invention typically can alter the surface of a coating in such a way that the light falling on it is scattered in a defined fashion. The matting agent particles stand out from the coating, but are invisible to the human eye. The color of the coating is not affected by the matting agent to any great extent. Representative examples of such matting agents include inorganic matting agents such as silica-based ACEMATT® matting agents from Evonik Degussa (Parsippany, N.J.) and silica-based matting agents available from Ineos Silicas (Hampshire, United Kingdom). The matting agents may vary in size and include materials that are micron sized particles.

For example, the particles may have an average diameter of from about 0.1 to 1000 microns, and in one embodiment from 0.1 to 100 microns. Combinations of matting agents may be used.

The pigments used in the practice of this invention may be of any color or combination of colors, as well as employed in any pattern or combination of patterns. The pigments used herein are typically inorganic materials. Inorganic pigments can be crystals of metal oxides. This structure is extremely stable, and sets it apart from organic pigments, which are generally composed of carbon, oxygen, and nitrogen. Such pigments include mixed metal oxides that include more than one type of metal atom along with the oxygen to make the pigment. In general, pigments are produced by the high temperature calcination of high grade metal oxides in a kiln according to given time and temperature profiles. The resulting mixed metal oxide can be milled using a variety of high-energy techniques in order to reduce the particle size. The pigments used herein are typically stable at high temperatures. Representative examples of such pigments include black and gray inorganic pigments, such as the camouflage inorganic pigment packages from Shepherd Color (West Chester, Ohio). The camouflage pigment CM2581 available from Shepherd Color contains a mixture of chromic oxide (2-8%), copper chromite black spinel (20-30%), titanium dioxide (50-70%), zinc iron chromate black spinel (10-15%). Combinations of pigments may be used as needed.

Other materials may be included in the composition of this invention including, but not limited to, flow and leveling agents such as available from BYK (Wesel, Germany), hydrophobic fumed silica such as available from Evonik Degussa (Parsippany, N.J.), alumina fibers and silicon carbide fibers such as available from Sigma Aldrich (St. Louis, Mo.), and the like.

In addition, the coating composition additives typically comprise less than about 10% of the total silicon based coating composition. In some embodiments, the additive comprises about 9%, 8%, 7%, 6%, 5%, 4%, 3%, 2%, 1%, 0.1%, or 0% (w/w) of the total composition.

The coating composition may be applied by dipping, spraying, brushing, painting, wiping, immersion, or spin-coating techniques. These procedures will typically provide polymer coatings of thicknesses on the order of 1 micron ($\mu$, or micrometer $\mu m$) or even thinner, to up to about 75 micron per coat for the cured polymers. If a thicker coating is desired, multiple coating layers may be provided. The clear coat formulations as provided herein result in a coating transparent and therefore do not affect the optical appearance of the substrate. Due to the small coat thickness, only a very small amount of material is required, which is advantageous both in terms of cost and also ecologically, and the weight change of the substrate to be coated is nearly unnoticeable. The coat thickness of the silicon based coating as provided herein following evaporation of the solvent and curing is in the range from about 0.1 to about 50 micron, preferably from about 0.5 to about 40 micron, particularly preferably from about 1 to about 25 micron.

Curing is the process of polymerization after the coating is applied. Curing process can be controlled through temperature, air flow, the ratio of the solvents, choice of resin and hardener compounds, and the ratio of said compounds. The curing process can take minutes to hours. Some coating formulations benefit from heating during the curing period, whereas others simply require time and ambient temperatures. Coatings may be ambiently cured at room temperature ranging from 5-40° C. By providing slight amount of heat the curing time can be shortened. Preferably, curing is performed at temperatures not exceeding about 100° C. These curing atmospheres include, but are not limited to, air and other non-reactive or reactive gaseous environments which contain moisture, inert gases like nitrogen and argon, and reactive gases such as ammonia, hydrogen, carbon monoxide, and so on. Rapid cure times are achieved when applying the coating formulations as disclosed herein to surfaces which are subsequently exposed to the moisture-containing atmosphere at room temperature.

Coating related testing provides quality control and product description based on industrial standards. Typical coating tests may include, but not limited to, thickness test, coefficient of friction test, hardness test, scratch resistance test (testing the amount of force needed to scratch the coating from substrate), 90 degree peel from topcoat test, 90 degree peel from adhesive test, cross-hatch adhesion test. In particular, a thickness test, measuring the thickness of substrates and top-coated materials, may be carried out using test panels on which uniform films are produced by a coating suitable for spraying; using micrometers for dried films; using magnetic gages for nonmagnetic coatings; using Wet Film Thickness Gage or Pfund Gage for wet film thickness; or using microscopic observation of precision angular cuts in the coating film. Hardness test of organic materials may be carried out using indentation hardness measurements, Sward-type hardness rocker instruments, or pendulum damping testers. In addition, the "kinetic coefficient of friction" (COF, $\mu$), also known as a "frictional coefficient" or "friction coefficient", describes the ratio of the force of friction between two bodies and the force pressing them together. Coefficients of friction range from near zero to greater than one. Rougher surfaces tend to have higher effective values. The COF measured under ASTM D1894 is called Standard COF. More standard ASTM (American Society for Testing and Materials) test methods for coatings are available at World Wide Web: wernerblank.com/polyur/testmethods/coating_test.htm. Preferably, in one embodiment, the thickness of the silicon based coating resulted from the compositions provided herein is between from about 1 micron to about 45 micron. In one embodiment, the hardness of the silicon based coating resulted from the compositions provided herein ranges from about 2H to about 9H, using ASTM D3363 standard. Further, in one embodiment, the COF of the silicon based coating resulted from the compositions provided herein is between from about 0.03 to about 0.04.

Surfaces, substrates and substrate layers suitable for coating compositions provided herein may comprise any desirable substantially solid material that vary widely. For example, the type of surfaces that can be treated with the compositions of this invention includes glass; ceramics, such as, silicon nitride, silicon carbide, silica, alumina, zirconia, and the like; metals, such as, iron, stainless steel, galvanized steel, zinc, aluminum, nickel, copper, magnesium and alloys thereof, silver and gold and the like; plastics, such as, polymethyl methacrylate, polyurethane, polycarbonate, polyesters including polyethylene terephthalate, polyimides, polyamides, epoxy resins, ABS polymer, polyethylene, polypropylene, polyoxymethylene; porous mineral materials, such as, concrete, clay bricks, marble, basalt, asphalt, loam, terracotta; organic materials, such as wood, leather, parchment, paper and textiles; and coated surfaces, such as, plastics emulsion paints, acrylic coatings, epoxy coatings, melamine resins, polyurethane resins and alkyd coatings. The surface or substrate contemplated herein may also comprise at least two layers of materials. One layer of material, for example, may include glass, metal, ceramic, plastics, wood or composite material. Other layers of material comprising the surface or substrate may include layers of polymers, monomers, organic compounds, inorganic compounds, organometallic compounds, continuous layers and nanoporous layers.

Further, the surfaces and substrates may have different shapes, e.g., substrates having flat, planar surfaces, molded articles having curved surfaces, fibers, fabrics, and the like. It will be appreciated by those skilled in the art that the foregoing lists are merely illustrative of various materials which may be coated using the presently disclosed compositions and methods, and are not in any way limiting of the different substrates with which the present invention is useful. Insofar as they protect virtually any type of substrate from oxidative thermal degradation, corrosion, or chemical attack. The coatings may also be used to strengthen relatively flaw sensitive brittle substrates such as glass and non-wetting surfaces. The coatings may additionally be useful to provide bonding or compatibility interfaces between different types of materials.

A particularly advantageous use of this coating is as a coating on automobile, aircraft, missiles, marine vessels, wheels, wind generation equipment and blades, solar panels, building surfaces, public spaces, packaging surfaces, outdoor signs and advertisement billboard or LED screens. Those surfaces are exposed to UV, heat, coldness, moisture, ice build-up, chemical corrosion, wear and tear from natural physical forces creating friction such as, water, air flow and dust. In addition, such protection is also suitable for mechanical components exposed to high temperatures, including, for example, exterior aircraft surfaces, a wing slat or pylon made of titanium, aluminum or cress metal heat shields on an aircraft or other coated aircraft areas subject to engine efflux. A protective film provided by the silicon based coating compositions disclosed herein over the base layer of paint or surface material of these surfaces is particularly useful to protect them from external forces, which can be destructive over a period of time.

Although the invention described herein is susceptible to various modifications and alternative iterations, specific embodiments thereof have been described in greater detail above. It should be understood, however, that the detailed description of the spot-on composition is not intended to limit the invention to the specific embodiments disclosed. Rather, it should be understood that the invention is intended to cover all modifications, equivalents, and alternatives falling within the spirit and scope of the invention as defined by the claim language.

Definitions

As used herein, the terms "about" and "approximately" designate that a value is within a statistically meaningful range. Such a range can be typically within 20%, more typically still within 10%, and even more typically within 5% of a given value or range. The allowable variation encompassed by the terms "about" and "approximately" depends on the particular system under study and can be readily appreciated by one of ordinary skill in the art.

As used herein, the term "w/w" designates the phrase "by weight" and is used to describe the concentration of a particular substance in a mixture or solution.

As used herein, the term "mL/kg" designates milliliters of composition per kilogram of body weight.

As used herein, the term "cure" or "curing" refers to a change in state, condition, and/or structure in a material that is usually, but not necessarily, induced by at least one variable, such as time, temperature, moisture, radiation, presence and quantity in such material of a catalyst or accelerator or the like. The terms cover partial as well as complete curing.

As used herein, the term "hardness" or "H" designates the property of a material that enables it to resist plastic deformation, usually by penetration. However, the term hardness may also refer to resistance to bending, scratching, abrasion or cutting. The usual method to achieve a hardness value is to measure the depth or area of an indentation left by an indenter of a specific shape, with a specific force applied for a specific time. There are four principal standard test methods for expressing the relationship between hardness and the size of the impression, these being Pencil Hardness ASTM D3363, Brinell, Vickers, and Rockwell. For practical and calibration reasons, each of these methods is divided into a range of scales, defined by a combination of applied load and indenter geometry.

As used herein, the term "coefficient of friction" (COF), also known as a 'frictional coefficient' or 'friction coefficient' or "kinetic coefficient of friction" and is an empirical measurement which describes the ratio of the force of friction between two bodies and the force pressing them together. The coefficient of friction depends on the materials used. When the coefficient of friction is measured by a standardized surface, the measurement is called "standardized coefficient of friction".

As used herein, the term "corrosion resistant agent" or variation thereof refers to additives in the coating on a surface which inhibit the corrosion of the surface substrate when it is exposed to air, heat, or corrosive environments for prolonged time periods.

As used herein, the term "monomer" refers to any chemical compound that is capable of forming a covalent bond with itself or a chemically different compound in a repetitive manner. The repetitive bond formation between monomers may lead to a linear, branched, super-branched, or three-dimensional product. Furthermore, monomers may themselves comprise repetitive building blocks, and when polymerized the polymers formed from such monomers are then termed "blockpolymers". Monomers may belong to various chemical classes of molecules including organic, organometallic or inorganic molecules. The molecular weight of monomers may vary greatly between about 40 Dalton and 20000 Dalton. However, especially when monomers comprise repetitive building blocks, monomers may have even higher molecular weights. Monomers may also include additional reactive groups.

Contemplated polymers may also comprise a wide range of functional or structural moieties, including aromatic systems, and halogenated groups. Furthermore, appropriate polymers may have many configurations, including a homopolymer, and a heteropolymer. Moreover, alternative polymers may have various forms, such as linear, branched, super-branched, or three-dimensional. The molecular weight of contemplated polymers spans a wide range, typically between 400 Dalton and 400000 Dalton or more.

The following examples are intended to further illustrate and explain the present invention. The invention, therefore, should not be limited to any of the details in these examples.

EXAMPLES

Example 1—Preparation of Resin Systems for Making Silicon Based Coating Compositions The silicon-based coating formulations provided herein were formed from two or more different resin systems chosen from, what was known as A-Resin, B-Resin, C-Resin, and any combinations thereof. The A-Resin was made according to the formulation provided in Table 1. The A-Resin was purchased from KiON Defense Technologies (Huntingdon Valley, Pa.), and it was sold as KDT HTA 1500 Fast™, an air curable liquid polysiloxazane based coating resin (8.9 lbs/Gallon).

TABLE 1

A-Resin formulation

| Ingredient | CAS NO | Amount (w/w) Appx. |
|---|---|---|
| Polysilazane | | >99% (w/w) |
| Cyclosilazane | CAS# 503590-70-3 | <5% (w/w) |
| n-Butyl Acetate (or tert-Butyl Acetate) | CAS# 123-86-4 (CAS# 540-88-5) | <3% (w/w) |

The B-Resin was made according to the formulation provided in Table 2. The B-Resins was purchased from Genesee Polymers Corp. (Burton, Mich.), and it was sold as Dimethyl Silicone Fluids G-10 products (8.0 lbs/Gallon).

TABLE 2

B-Resin formulation

| Ingredient | CAS NO | Amount (w/w) Appx. |
|---|---|---|
| Polydimethylsiloxane Fluid | CAS# 63148-62-9 | <5% (w/w) |
| Isopropyl Acetate Solvent | CAS# 108-24-4 | <98% (w/w) |

The C-Resin was made according to the formulation provided in Table 3. The C-Resins was purchased from Kadko, Inc. (Beech Grove, Ind.), and it was sold as a polysilane/polysilazane based KADKLAD R2X3™ product.

TABLE 3

C-Resin formulation

| Ingredient | CAS NO | Amount (w/w) Appx. |
|---|---|---|
| Polysilane/polysilazane blend | | <8% (w/w) |
| Solvent Blend | | |
| Isopropyl Acetate | CAS# 108-21-4 | 25-35% |
| Isoparaffinic Hydrocarbon | CAS# 64741-66-8 | 50-60% |
| Aliphatic Hydrocarbon | CAS# 64742-47-8 | 5-10% |
| Acetate Ester | CAS# 108419-34-7 | 1-5% |

The A-, B-, and C-Resin systems were then used in appropriate amount for different clear coat formulations, as such a mix of polysilazane, polysiloxane and/or polysilane and acetate solvent was used to produce formulations of coating products with various desired properties as described below.

Characteristics of the coating products using the formulations provided herein included clear, thin, light, slick, hard, heat resistant, high temperature resistant, ice build-up resistant, UV resistant, chemical resistant, and microbial resistant.

Example 2—Clear Coat Formulation MX 6%

A clear coat silicon-based coating formulation was made according to the formulation provided in Table 4. The clear coat was formed by mixing the A- and C-Resins in the amount listed below. The formulation was to be used to coat the face of a glass top.

TABLE 4

Clear Coat Silicon Based Coating MX 6% Composition

| INGREDIENT | AMOUNT (w/w) |
|---|---|
| 1. Base Resin Mixture | |
| A-Resin: | 6% (w/w) |
| C-Resin: | 67% (w/w) |
| 2. Solvent | |
| tert-Butyl Acetate CAS# 540-88-5 | 27% (w/w) |
| | Total = 100% (w/w) |

To blend the ingredients and make 10 gallons of MX 6% coating composition, each component was measured out to the appropriate percentage of the formula needed to create the coating. Each of ingredients was pre-weighed: 6% by formula weight of 10 gallons A-Resin, 67% by formula weight of 10 gallons C-Resin, 26% by formula weight of 10 gallons tert-butyl acetate, and 1% by formula weight of 10 gallons Micropro™ 600VF (Micro Powders, Inc., Tarrytown, N.Y.). The Micropro 600VF was added to adjust the gloss factor of the finished product when cured. The base resin mixture was first made by mixing A-Resin with C-Resin, followed by adding the solvent. When the ingredients were mixed into and within one mixture, the mixture was thoroughly mixed by stir paddle until a homogenous or uniform blend was formed. The stir paddle was rotated at about 500 rpm, and the mixing took approximately five (5) minutes. The finished formulated resin system was then filtered through a 120 mesh paint filter (U.S. standard sieve size, same below) such that there were no particles or debris left within the coating mixture. This filtered resin system was then spray coated onto a glass panel. The coating had a thickness of about 0.1 to 0.4 mil (1 mil=0.001 inches or 25.4 µm). The theoretical coverage of this formulation is 3800 sq/ft per gal for a thickness of 0.2 mil. Pre-conditioning of the substrate surface can be but not limited to dry, clean and contamination free surface.

After application, the coating was allowed to ambient-cure at room temperature for 15 minutes, it then became dry to touch achieving approximately 25% of cured film property values. An additional allowance of 36 hours resulted in a finished clear coating with full property values. The coating was tested in accordance with ASTM D3363 test standards for hardness resulting in a clear coating with a hardness of 4-5H. Additionally a standardized kinetic coefficient of friction test of ASTM D1894 resulted in test results indicating a 0.04 kinetic coefficient of friction, which exceeds that of PTFE based materials that exhibit 0.05-0.08 kinetic coefficient of friction results. As such, a clear coating with a hardness of 4-5H and a kinetic coefficient of friction equal to 0.04 was formed.

Example 3—Clear Coat Formulation MX 8%

A clear coat silicon based coating formulation was made according to the formulation provided in Table 5. The base resin mixture of this particular clear coat was formed by mixing the A-, B- and C-Resins in the amount listed below. The formulation was to be used to coat the face of a metal surface.

TABLE 5

Clear Coat Silicon Based Coating MX 8% Composition

| INGREDIENT | AMOUNT (w/w) |
| --- | --- |
| 1. Base Resin Mixture | |
| A-Resin: | 8% (w/w) |
| B-Resin: | 8% (w/w) |
| C-Resin: | 73% (w/w) |
| 2. Solvent | |
| tert-Butyl Acetate CAS# 540-88-5 | <12% (w/w) |
| High-purity Synthetic Isoparaffin (Isopar™-G) | <12% (w/w) |
| 3. Additives | |
| Matting Agents | <2% (w/w) |
| Texturing Agents | <2% (w/w) |
| | Total = 100% (w/w) |

To blend the ingredients and make 10 gallons of MX 8% coating composition, the B-Resin and C-Resin needed to be blended together first. To blend these two resins, the B-Resin and C-Resin were agitated prior to blending. After agitation, 8% by formula weight of 10 gallons B-Resin, 73% by formula weight of 10 gallons C-Resin were weighed out, and then blended using a mix paddle for a few minutes to obtain a uniform mixture. Since both the B- and C-Resin were very fluid in nature, no extreme agitation was required.

The other ingredients were then weighed out: 8% by formula weight of 10 gallons A-Resin, 11% by formula weight of 10 gallons tert-butyl acetate. The base resin mixture was first made by mixing 8% by formula weight of 10 gallons A-resin with B- and C-Resin blend followed by adding the solvent. When the ingredients were mixed into and within one mixture, the mixture was thoroughly mixed by stir paddle until a homogenous or uniform blend was formed. The stir paddle was rotated at about 500 rpm, and the mixing took approximately five (5) minutes. The finished formulated resin system was then filtered through a 120 mesh paint filter (U.S. standard sieve size, same below) such that there were no particles or debris left within the coating mixture. This filtered resin system was then spray coated onto a glass panel. The coating had a thickness of about 0.1 to 0.5 mil (1 mil=0.001 inches or 25.4 μm or 25.4μ). The theoretical coverage of this formulation is 3000 sq/ft per gal for a thickness of 0.3 mil. Pre-conditioning of the substrate surface can be but not limited to dry, clean and contamination free surface.

After application, the coating was allowed to ambient-cure at room temperature for 15 minutes, it then became dry to touch achieving approximately 25% of cured film property values. An additional allowance of 36 hours resulted in a finished clear coating with full property values. The coating was tested in accordance with ASTM D3363 test standards for hardness resulting in a clear coating with a hardness of 4-5H. Additionally a standardized kinetic coefficient of friction test of ASTM D1894 resulted in test results indicating a 0.04 kinetic coefficient of friction, which exceeds that of PTFE based materials that exhibit 0.05-0.08 kinetic coefficient of friction results. As such, a clear coating with a hardness of 4-5H and a kinetic coefficient of friction equal to 0.04 was formed.

Example 4—Clear Coat Formulation MX 17%

A clear coat silicon based coating formulation was made according to the formulation provided in Table 6. The base resin mixture of this particular clear coat was formed by mixing the A-, B- and C-Resins in the amount listed below. The formulation was to be used to coat the face of a painted surface.

TABLE 6

Clear Coat Silicon Based Coating MX 17% Composition

| INGREDIENT | AMOUNT (w/w) |
| --- | --- |
| 1. Base Resin Mixture | |
| A-Resin: | 17% (w/w) |
| B-Resin: | 7% (w/w) |
| C-Resin: | 72% (w/w) |
| 2. Solvent | |
| tert-Butyl Acetate CAS# 540-88-5 | <2% (w/w) |
| High-purity Synthetic Isoparaffin (Isopar™-G) | <2% (w/w) |
| 3. Additives | |
| Matting Agents | <2% (w/w) |
| Texturing Agents | <2% (w/w) |
| | Total = 100% (w/w) |

To blend the ingredients and make 10 gallons of MX 17% coating composition, the B-Resin and C-Resin needed to be blended together first. To blend these two resins, the B-Resin and C-Resin were agitated prior to blending. After agitation, 7% by formula weight of 10 gallons B-Resin, 72% by formula weight of 10 gallons C-Resin were weighed out, and then blended using a mix paddle for a few minutes to obtain a uniform mixture. Since both the B- and C-Resin were very fluid in nature, no extreme agitation was required.

The other ingredients were then weighed out: 17% by formula weight of 10 gallons A-Resin, and 1% by formula weight of 10 gallons NyloTex200 (Micro Powders, Inc., Tarrytown, N.Y.). The NyloTex200 was added to adjust the slip resistance of the finished product when cured. The base resin mixture was first made by mixing 17% by formula weight of 10 gallons A-resin with B- and C-Resin blend followed by adding the additive. When the ingredients were mixed into and within one mixture, the mixture was thoroughly mixed by stir paddle until a homogenous or uniform blend was formed. The stir paddle was rotated at about 500 rpm, and the mixing took approximately five (5) minutes. The finished formulated resin system was then filtered through a 120 mesh paint filter (U.S. standard sieve size, same below) such that there were no particles or debris left within the coating mixture. This filtered resin system was then spray coated onto a glass panel. The coating had a thickness of about 0.1 to 0.5 mil (1 mil=0.001 inches or 25.4 μm). The theoretical coverage of this formulation is 3000 sq/ft per gal for a thickness of 0.3 mil. Pre-conditioning of the substrate surface can be but not limited to dry, clean and contamination free surface.

After application, the coating was allowed to ambient-cure at room temperature for 15 minutes, it then became dry to touch achieving approximately 25% of cured film property values. An additional allowance of 36 hours resulted in a finished clear coating with full property values. The coating was tested in accordance with ASTM D3363 test standards for hardness resulting in a clear coating with a hardness of 4-5H. A coefficient of friction test is not warranted, as this is an anti-slip formulation, but overall coating remains easy to clean.

Example 5—Clear Coat Formulation MX 28%

A clear coat silicon based coating formulation was made according to the formulation provided in Table 4. The clear coat was formed by mixing the A- and C-Resins in the amount listed below. The formulation was to be used to coat over a glass top.

TABLE 7

Clear Coat Silicon Based Coating MX 28% Composition

| INGREDIENT | AMOUNT (w/w) |
| --- | --- |
| 1. Base Resin Mixture | |
| A-Resin: | 28% (w/w) |
| C-Resin: | 10% (w/w) |
| 2. Solvent | |
| tert-Butyl Acetate CAS# 540-88-5 | <49% (w/w) |
| High-purity Synthetic Isoparaffin (Isopar™-G) | <14% (w/w) |
| 3. Additives | |
| Matting Agents | <2% (w/w) |
| Texturing Agents | <2% (w/w) |
| Total = | 100% (w/w) |

To blend the ingredients and make 10 gallons of MX 28% coating composition, each component was measured out to the appropriate percentage of the formula needed to create the coating. Each of ingredients was pre-weighed: 28% by formula weight of 10 gallons A-Resin, 10% by formula weight of 10 gallons C-Resin, 48% by formula weight of 10 gallons tert-butyl acetate, 13% by formula weight of 10 gallons Isopar-G (Exxon Comp. Houston, Tex.) and 1% by formula weight of 10 gallons Micropro 600VF (Micro Powders, Inc., Tarrytown, N.Y.). The Micropro 600VF was added to adjust the gloss factor of the finished product when cured. The base resin mixture was first made by mixing A-Resin with C-Resin, followed by adding the solvents and the additive. When the ingredients were mixed into and within one mixture, the mixture was thoroughly mixed by stir paddle until a homogenous or uniform blend was formed. The stir paddle was rotated at about 500 rpm, and the mixing took approximately five (5) minutes. The finished formulated resin system was then filtered through a 120 mesh paint filter (U.S. standard sieve size, same below) such that there were no particles or debris left within the coating mixture. This filtered resin system was then spray coated onto a glass panel. The coating had a thickness of about 0.2 to 1 mil (1 mil=0.001 inches or 25.4 μm). The theoretical coverage of this formulation is 2400 sq/ft per gal for a thickness of 1.0 mil. Pre-conditioning of the substrate surface can be but not limited to dry, clean and contamination free surface.

After application, the coating was allowed to ambient-cure at room temperature for 15 minutes, it then became dry to touch achieving approximately 25% of cured film property values. An additional allowance of 36 hours resulted in a finished clear coating with full property values. The coating was tested in accordance with ASTM D3363 test standards for hardness resulting in a clear coating with a hardness of 5-6H. Additionally a standardized kinetic coefficient of friction test of ASTM D1894 resulted in test results indicating a 0.04 kinetic coefficient of friction, which exceeds that of PTFE based materials that exhibit 0.05-0.08 kinetic coefficient of friction results. As such, a clear coating with a hardness of 4-5H and a kinetic coefficient of friction equal to 0.04 was formed.

Example 6—Clear Coat Formulation MX 36%

A clear coat silicon based coating formulation was made according to the formulation provided in Table 8. The clear coat was formed by mixing the A- and C-Resins in the amount listed below. The formulation was to be used to coat over a glass top.

TABLE 8

Clear Coat Silicon Based Coating MX 36% Composition

| INGREDIENT | AMOUNT (w/w) |
| --- | --- |
| 1. Base Resin Mixture | |
| A-Resin: | 36% (w/w) |
| C-Resin: | 28% (w/w) |
| 2. Solvent | |
| tert-Butyl Acetate CAS# 540-88-5 | <32% (w/w) |
| High-purity Synthetic Isoparaffin (Isopar-G) | <8% (w/w) |
| 3. Additives | |
| Matting Agents | <2% (w/w) |
| Texturing Agents | <2% (w/w) |
| Total = | 100% (w/w) |

To blend the ingredients and make 10 gallons of MX 36% coating composition, each component was measured out to the appropriate percentage of the formula needed to create the coating. Each of ingredients was pre-weighed: 36% by formula weight of 10 gallons A-Resin, 28% by formula weight of 10 gallons C-Resin, 30% by formula weight of 10 gallons tert-butyl acetate, and 6% by formula weight of 10 gallons Isopar-G (Exxon Comp. Houston, Tex.). The base resin mixture was first made by mixing A-Resin with C-Resin, followed by adding the solvents and the additive. When the ingredients were mixed into and within one mixture, the mixture was thoroughly mixed by stir paddle until a homogenous or uniform blend was formed. The stir paddle was rotated at about 500 rpm, and the mixing took approximately five (5) minutes. The finished formulated resin system was then filtered through a 120 mesh paint filter (U.S. standard sieve size, same below) such that there were no particles or debris left within the coating mixture. This filtered resin system was then spray coated onto a glass panel. The coating had a thickness of about 0.2 to 1.0 mil (1 mil=0.001 inches or 25.4 μm). The theoretical coverage of this formulation is 2200 sq/ft per gal for a thickness of 1 mil. Pre-conditioning of the substrate surface can be but not limited to dry, clean and contamination free surface.

After application, the coating was allowed to ambient-cure at room temperature for 15 minutes, it then became dry to touch achieving approximately 25% of cured film property values. An additional allowance of 36 hours resulted in a finished clear coating with full property values. The coating was tested in accordance with ASTM D3363 test standards for hardness resulting in a clear coating with a hardness of 5-6H. Additionally a standardized kinetic coefficient of friction test of ASTM D1894 resulted in test results indicating a 0.04 kinetic coefficient of friction, which exceeds that of PTFE based materials that exhibit 0.05-0.08 kinetic coefficient of friction results. As such, a clear coating with a hardness of 4-5H and a kinetic coefficient of friction equal to 0.04 was formed.

Example 7—Clear Coat Formulation MX 40%

A clear coat silicon based coating formulation was made according to the formulation provided in Table 9. The clear coat was formed by mixing the A- and C-Resins in the amount listed below. The formulation was to be used to coat over a composite top.

TABLE 9

Clear Coat Silicon Based Coating MX 40% Composition

| INGREDIENT | AMOUNT (w/w) |
| --- | --- |
| 1. Base Resin Mixture | |
| A-Resin: | 40% (w/w) |
| C-Resin: | 25% (w/w) |
| 2. Solvent | |
| tert-Butyl Acetate CAS# 540-88-5 | <25% (w/w) |
| High-purity Synthetic Isoparaffin (Isopar-G) | <12% (w/w) |
| 3. Additives | |
| Matting Agents | <2% (w/w) |
| Texturing Agents | <2% (w/w) |
| | Total = 100% (w/w) |

To blend the ingredients and make 10 gallons of MX 40% coating composition, each component was measured out to the appropriate percentage of the formula needed to create the coating. Each of ingredients was pre-weighed: 40% by formula weight of 10 gallons A-Resin, 25% by formula weight of 10 gallons C-Resin, 24% by formula weight of 10 gallons tert-butyl acetate, 10% by formula weight of 10 gallons Isopar-G (Exxon Comp. Houston, Tex.) and 1% by formula weight of 10 gallons Micropro 600VF (Micro Powders, Inc., Tarrytown, N.Y.). The Micropro 600VF was added to adjust the gloss factor of the finished product when cured. The base resin mixture was first made by mixing A-Resin with C-Resin, followed by adding the solvents and the additive. When the ingredients were mixed into and within one mixture, the mixture was thoroughly mixed by stir paddle until a homogenous or uniform blend was formed. The stir paddle was rotated at about 500 rpm, and the mixing took approximately five (5) minutes. The finished formulated resin system was then filtered through a 120 mesh paint filter (U.S. standard sieve size, same below) such that there were no particles or debris left within the coating mixture. This filtered resin system was then spray coated onto a glass panel. The coating had a thickness of about 0.2 to 1.0 mil (1 mil=0.001 inches or 25.4 μm). The theoretical coverage of this formulation is 2400 sq/ft per gal for a thickness of 1.0 mil. Pre-conditioning of the substrate surface can be but not limited to dry, clean and contamination free surface.

After application, the coating was allowed to ambient-cure at room temperature for 15 minutes, it then became dry to touch achieving approximately 25% of cured film property values. An additional allowance of 36 hours resulted in a finished clear coating with full property values. The coating was tested in accordance with ASTM D3363 test standards for hardness resulting in a clear coating with a hardness of 5-6H. Additionally a standardized kinetic coefficient of friction test of ASTM D1894 resulted in test results indicating a 0.04 kinetic coefficient of friction, which exceeds that of PTFE based materials that exhibit 0.05-0.08 kinetic coefficient of friction results. As such, a clear coating with a hardness of 4-5H and a kinetic coefficient of friction equal to 0.04 was formed.

Example 8—Clear Coat Formulation MX 50%

A clear coat silicon based coating formulation was made according to the formulation provided in Table 10. The clear coat was formed by mixing the A- and C-Resins in the amount listed below. The formulation was to be used to coat over a gel coated surface.

TABLE 10

Clear Coat Silicon Based Coating MX 50% Composition

| INGREDIENT | AMOUNT (w/w) Appx. |
| --- | --- |
| 1. Base Resin Mixture | |
| A-Resin: | 50% (w/w) |
| C-Resin: | 25% (w/w) |
| 2. Solvent | |
| tert-Butyl Acetate CAS# 540-88-5 | <15% (w/w) |
| High-purity Synthetic Isoparaffin (Isopar-G) | <12% (w/w) |
| 3. Additives | |
| Matting Agents | <2% (w/w) |
| Texturing Agents | <2% (w/w) |
| | Total = 100% (w/w) |

To blend the ingredients and make 10 gallons of MX 50% coating composition, each component was measured out to the appropriate percentage of the formula needed to create the coating. Each of ingredients was pre-weighed: 50% by formula weight of 10 gallons A-Resin, 25% by formula weight of 10 gallons C-Resin, 14% by formula weight of 10 gallons tert-butyl acetate, 10% by formula weight of 10 gallons Isopar-G (Exxon Comp. Houston, Tex.) and 1% by formula weight of 10 gallons Micropro 600VF (Micro Powders, Inc., Tarrytown, N.Y.). The Micropro 600VF was added to adjust the gloss factor of the finished product when cured. The base resin mixture was first made by mixing A-Resin with C-Resin, followed by adding the solvents and the additive. When the ingredients were mixed into and within one mixture, the mixture was thoroughly mixed by stir paddle until a homogenous or uniform blend was formed. The stir paddle was rotated at about 500 rpm, and the mixing took approximately five (5) minutes. The finished formulated resin system was then filtered through a 120 mesh paint filter (U.S. standard sieve size, same below) such that there were no particles or debris left within the coating mixture. This filtered resin system was then spray coated onto a glass panel. The coating had a thickness of about 0.5 to 1.0 mil (1 mil=0.001 inches or 25.4 μm). The theoretical coverage of this formulation is 2000 sq/ft per gal for a thickness of 1.0 mil. Pre-conditioning of the substrate surface can be but not limited to dry, clean and contamination free surface.

After application, the coating was allowed to ambient-cure at room temperature for 15 minutes, it then became dry to touch achieving approximately 25% of cured film property values. An additional allowance of 36 hours resulted in a finished clear coating with full property values. The coating was tested in accordance with ASTM D3363 test standards for hardness resulting in a clear coating with a hardness of 6-9H. Additionally a standardized kinetic coefficient of friction test of ASTM D1894 resulted in test results indicating a 0.03 kinetic coefficient of friction, which exceeds that of PTFE based materials that exhibit 0.05-0.08 kinetic coefficient of friction results. As such, a clear coating with a hardness of 6-9H and a kinetic coefficient of friction equal to 0.03 was formed.

Example 9—Clear Coat Formulation MX 66%

A clear coat silicon based coating formulation was made according to the formulation provided in Table 11. The base resin mixture of this particular clear coat was formed by mixing the A-, B- and C-Resins in the amount listed below. The formulation was to be used to coat over a gel coated surface.

TABLE 11

Clear Coat Silicon Based Coating MX 66% Composition

| INGREDIENT | AMOUNT (w/w) Appx. |
|---|---|
| 1. Base Resin Mixture | |
| A-Resin: | 66% (w/w) |
| B-Resin: | 17% (w/w) |
| C-Resin: | 17% (w/w) |
| 2. Solvent | |
| tert-Butyl Acetate CAS# 540-88-5 | 0% (w/w) |
| High-purity Synthetic Isoparaffin (Isopar-G) | 0% (w/w) |
| 3. Additives | |
| Matting Agents | <2% (w/w) |
| Texturing Agents | <2% (w/w) |
| | Total = 100% (w/w) |

To blend the ingredients and make 10 gallons of MX 66% coating composition, the B-Resin and C-Resin needed to be blended together first. To blend these two resins, the B-Resin and C-Resin were agitated prior to blending. After agitation, 16% by formula weight of 10 gallons B-Resin, 16% by formula weight of 10 gallons C-Resin were weighed out, and then blended using a mix paddle for a few minutes to obtain a uniform mixture. Since both the B- and C-Resin were very fluid in nature, no extreme agitation was required.

The other ingredients were then weighed out: 66% by formula weight of 10 gallons A-Resin. The base resin mixture was made by mixing 66% by formula weight of 10 gallons A-resin with B- and C-Resin blend. When the ingredients were mixed into and within one mixture, the mixture was thoroughly mixed by stir paddle until a homogenous or uniform blend was formed. The stir paddle was rotated at about 500 rpm, and the mixing took approximately five (5) minutes. The finished formulated resin system was then filtered through a 120 mesh paint filter (U.S. standard sieve size, same below) such that there were no particles or debris left within the coating mixture. This filtered resin system was then spray coated onto a glass panel. The coating had a thickness of about 0.75 to 1.5 mil (1 mil=0.001 inches or 25.4 µm). The theoretical coverage of this formulation is 2000 sq/ft per gal for a thickness of 1.0 mil. Pre-conditioning of the substrate surface can be but not limited to dry, clean and contamination free surface.

After application, the coating was allowed to ambient-cure at room temperature for 15 minutes, it then became dry to touch achieving approximately 25% of cured film property values. An additional allowance of 36 hours resulted in a finished clear coating with full property values. The coating was tested in accordance with ASTM D3363 test standards for hardness resulting in a clear coating with a hardness of 4-5H. A coefficient of friction test is not warranted, as this is an anti-slip formulation, but overall coating remains easy to clean.

Example 10—Clear Coat Formulation MX 50-50 Solution

A clear coat silicon based coating formulation was made according to the formulation provided in Table 4. The clear coat was formed by mixing the B- and C-Resins in the amount listed below. The formulation was to be used to coat the face of a glass top.

TABLE 12

Clear Coat Silicon Based Coating MX 50-50 Composition

| INGREDIENT | AMOUNT (w/w) |
|---|---|
| 1. Base Resin Mixture | |
| B-Resin: | 50% (w/w) |
| C-Resin: | 50% (w/w) |
| 2. Solvent | |
| tert-Butyl Acetate CAS# 540-88-5 | 0% (w/w) |
| | Total = 100% (w/w) |

To blend the ingredients and make 10 gallons of MX 50-50 coating composition, each component was measured out to the appropriate percentage of the formula needed to create the coating. Each of ingredients was pre-weighed: 50% by formula weight of 10 gallons is B-Resin, 50% by formula weight of 10 gallons is C-Resin. The base resin mixture was first made by mixing B-Resin with C-Resin. When the ingredients were mixed into and within one mixture, the mixture was thoroughly mixed by stir paddle until a homogenous or uniform blend was formed. The stir paddle was rotated at about 500 rpm, and the mixing took approximately five (5) minutes. The finished formulated resin system was then filtered through a 120 mesh paint filter (U.S. standard sieve size, same below) such that there were no particles or debris left within the coating mixture. This filtered resin system was then spray coated onto a metal test panel. The applied coating had a thickness of about 0.01 to 0.05 mil (1 mil=0.001 inches or 25.4 µm). The theoretical coverage of this formulation is: 5000 sq/ft per gal for a thickness of 0.03 mil. Pre-conditioning of the substrate surface can be but not limited to: dry, clean, and contamination free surface.

After application, the coating was allowed to ambient-cure at room temperature for 15 minutes. It then became dry to touch and created a finished clear coating with full property values. The coating was then tested in accordance with ASTM D3363 test standards for hardness resulting in a clear coating with a hardness of 2-4H. Additionally a standardized kinetic coefficient of friction test of ASTM D1894, resulting in test results indicated a 0.04 kinetic coefficient of friction, which exceeded that of PTFE based materials that exhibit 0.05-0.08 kinetic coefficient of friction results.

What is claimed is:

1. A silicon-based coating composition comprising:
polysilazane;
polysiloxane; and
polysilane comprising a formula $(R_1R_2Si)_n$, wherein n is greater than 1, and wherein $R_1$ and $R_2$ are the same or different and are chosen from alkyl, alkenyl, cycloalkyl, alkylamino, aryl, aralkyl, or alkylsilyl, which polysilane has a weight average molecular weight of more than 50,000.

2. The composition of claim 1, wherein the polysilazane has the formula $(CH_3)_3Si-NH-[(CH_3)_2Si-NH]_n-Si(CH_3)_3$, wherein n is greater than 1.

3. The composition of claim 1, comprising about 5% (w/w of the total composition) to about 80% (w/w of the total composition) polysilazane.

4. The composition of claim 3, comprising 15% (w/w of the total composition) to 20% (w/w of the total composition) polysilazane.

5. The composition of claim 1, wherein the polysiloxane has the formula $[SiOR_1R_2]_n$, wherein n is greater than 1, and each $R_1$ and $R_2$ is methyl.

6. The composition of claim 1, comprising about 20% (w/w of the total composition) to about 60% (w/w of the total composition) polysiloxane.

7. The composition of claim 6, comprising 25% (w/w of the total composition) to 30% (w/w of the total composition) polysiloxane.

8. The composition of claim 1, wherein the polysilane comprises the formula $[R_1R_2Si-R_1R_2Si]_n$, wherein n is greater than 1, and each $R_1$ and $R_2$ is methyl.

9. The composition of claim 1, comprising about 1% polysilane.

10. The composition of claim 1, further comprising 15% (w/w of the total composition) to 60% (w/w of the total composition) organic solvent.

11. The composition of claim 10, comprising about 55% (w/w of the total composition) to about 60% (w/w of the total composition) organic solvent.

12. The composition of claim 1, further comprising an organic solvent chosen from tert-butyl acetate, isopropyl acetate, methyl acetate, aliphatic hydrocarbon, and mixtures thereof.

13. A method of coating a surface, which method comprises:
a. coating onto a surface the silicon-based coating composition of claim 1; and
b. curing the coating ambiently to provide a non-ceramic clear coating.

14. The method of claim 13, wherein the coating step comprises wiping the coating composition onto the surface as a uniform wet film.

15. The method of claim 13, wherein the curing step occurs for at least 15 minutes at room temperature.

16. The method of claim 13, further comprising preconditioning the surface to be a clean surface before the coating step.

17. The method of claim 13, wherein the surface is porous and comprises a material chosen from an epoxy resin, a composite material, and mixtures thereof.

18. The method of claim 17, wherein the surface comprises an epoxy resin which comprises an amine hardener.

19. A cured coating formed from the method of claim 13.

20. The cured coating of claim 19, having a thickness ranging between 0.1 mil and 1.5 mil.

21. The cured coating of claim 19, having a hardness ranging between 2H and 9H in accordance with ASTM 3363 for film hardness by pencil test.

22. The cured coating of claim 19, having cured coating has a kinetic coefficient of friction between 0.03 and 0.04.

23. The composition of claim 1, comprising about 1% (w/w of the total composition) to about 5% (w/w of the total composition) polysilazane.

24. The composition of claim 1, comprising between 0% (w/w of the total composition) and 1% (w/w of the total composition) polysiloxane.

25. The composition of claim 1, comprising about 1% (w/w of the total composition) to about 5% (w/w of the total composition) polysilane.

26. The composition of claim 1, comprising about 1% (w/w of the total composition) to about 5% (w/w of the total composition) polysilazane; between 0% (w/w of the total composition) and 1% (w/w of the total composition) polysiloxane; and about 1% (w/w of the total composition) to about 5% (w/w of the total composition) polysilane.

27. A method of coating a surface, which method comprises:
a. coating onto a surface the silicon-based coating composition of claim 26; and
b. curing the coating ambiently to provide a non-ceramic clear coating.

28. A cured coating formed from the method of claim 27.

* * * * *